(12) United States Patent
Yu et al.

(10) Patent No.: US 9,959,041 B2
(45) Date of Patent: May 1, 2018

(54) METHOD OF EXECUTING A GUIDANCE DEVICE

(71) Applicant: WALTON ADVANCED ENGINEERING INC., Kaohsiung (TW)

(72) Inventors: Hong Chi Yu, Kaohsiung (TW); Mao Ting Chang, Kaohsiung (TW)

(73) Assignee: WALTON ADVANCED ENGINEERING INC., Kaohsiung (TW)

( * ) Notice: Subject to any disclaimer, the term of this patent is extended or adjusted under 35 U.S.C. 154(b) by 293 days.

(21) Appl. No.: 14/737,780

(22) Filed: Jun. 12, 2015

(65) Prior Publication Data

US 2016/0110329 A1   Apr. 21, 2016

(30) Foreign Application Priority Data

Oct. 16, 2014   (TW) .............................. 103135803 A

(51) Int. Cl.
| | |
|---|---|
| G06F 3/048 | (2013.01) |
| G06F 3/00 | (2006.01) |
| G06F 17/30 | (2006.01) |
| G06F 3/0488 | (2013.01) |
| G06Q 30/00 | (2012.01) |
| G06F 21/31 | (2013.01) |

(52) U.S. Cl.
CPC .......... *G06F 3/04886* (2013.01); *G06F 21/31* (2013.01); *G06Q 30/00* (2013.01); *G06F 2221/2115* (2013.01)

(58) Field of Classification Search
CPC ............. G06F 3/048; G06F 17/30; G06F 3/00
See application file for complete search history.

(56) References Cited

U.S. PATENT DOCUMENTS

| | | | |
|---|---|---|---|
| 8,468,457 B1* | 6/2013 | Kay ...................... | G06F 3/0489 715/744 |
| 8,627,120 B2* | 1/2014 | Conway ............... | G01C 21/265 713/300 |
| 2002/0138626 A1* | 9/2002 | Smith ................... | G06F 3/0481 709/227 |
| 2007/0244900 A1* | 10/2007 | Hopkins ........... | G06F 17/30873 |
| 2009/0287824 A1* | 11/2009 | Fisher ..................... | G06F 9/542 709/226 |

(Continued)

*Primary Examiner* — Hugo Molina
(74) *Attorney, Agent, or Firm* — Bacon & Thomas, PLLC

(57) ABSTRACT

An execution method of a guidance comprising of inserting the guidance device into a first terminal unit to simulate a keyboard and activate a specific internet address through an automatic key-in module with predefined keyboard output functions; activating the guidance device and an active component in the guidance device; making a request to the first terminal unit for linking a Human Interface Device; receiving signals that actively provides and recognizes the keyboard for the Human Interface Device; issuing a first command of sequentially pressing a plurality of keys through the automatic key-in module in the active component of the guidance device; activating a graphic interface through a hotkey of the automatic key-in module; automatically entering a specific address string into the activated graphic interface; and issuing a second command of pressing a Enter key for linking a website with the entered specific address string.

4 Claims, 4 Drawing Sheets

(56) References Cited

U.S. PATENT DOCUMENTS

| | | | | |
|---|---|---|---|---|
| 2010/0137028 A1* | 6/2010 | Farris | .................. | H04M 1/04 |
| | | | | 455/557 |
| 2012/0314358 A1* | 12/2012 | Ting | .................. | G06F 1/1626 |
| | | | | 361/679.09 |
| 2013/0227468 A1* | 8/2013 | Wu | .................. | G06F 3/0488 |
| | | | | 715/786 |
| 2013/0335914 A1* | 12/2013 | Lee | .................. | G06F 1/1632 |
| | | | | 361/679.41 |
| 2014/0057621 A1* | 2/2014 | Ji | .................. | H04M 1/72527 |
| | | | | 455/419 |
| 2014/0237375 A1* | 8/2014 | Schachtel | ......... | G06F 17/30991 |
| | | | | 715/741 |
| 2014/0245205 A1* | 8/2014 | Smith | .................. | G06F 17/3028 |
| | | | | 715/767 |
| 2014/0368159 A1* | 12/2014 | Han | .................. | H02M 3/155 |
| | | | | 320/107 |

* cited by examiner

METHOD OF EXECUTING A GUIDANCE DEVICE

BACKGROUND OF THE INVENTION

1) Field of the Invention

The present disclosure relates to automatic operation steps on a Human Interface Device, particularly automatic operation steps on a Human Interface Device for various USB (Universal Serial Bus) flash drives.

2) Description of the Prior Art

The practicability of multiple mobile devices which are popular with the general public is increased when all kinds of demands/services with respect to portable devices are created. In general, the products such as Internet advertising/marketing on mobile platforms, portable personal services and mobile payment have been available in lives of the masses.

In Internet advertising/marketing on mobile platforms, quick response codes extensively applied in mobile devices feature fast propagation and low cost, supporting automatic transmission of texts, digital content download, quick address link, identity authentication or business transaction.

The "quick address link" common in Internet marketing directs users to quickly link a website in which specific activities for marketing purposes are presented. The patents with respect to the quick address link are shown as follows:

TW 180839 disclosed a method for quick address (also known as Internet address) key-in based on a CCITT (International Telegraph and Telephone Consultative Committee) keyboard which is taken as a main tool for key-in on an electronic product. The method comprises steps as follows: an input signal is received; data with respect to configurations of an Internet address in a database is read and displayed by referring to the input signal; a selection signal which was received corresponds to the data with respect to configurations of an Internet address; the data with respect to configurations of an Internet address is entered into an edit field with "Enter" pressed. According to the method, any prefix, infix or suffix string is freely added into or deleted from an Internet address in the database.

TW 201316193 disclosed an electronic device which is used in data transmissions between a local storage and a web server. The local storage is able to store Internet addresses for websites and data of web pages with respect to Internet addresses. The electronic device comprises: a display unit on which web pages are displayed; a communications unit by which the electronic device is connected to the web server for data transmissions between the electronic device and the web server and real-time update of web pages corresponding to an Internet address in the local storage; a processing unit which responds to and accesses commands for web pages corresponding to an Internet address in the local storage and loads the web pages to be displayed on the display unit.

TW 1256825 disclosed a method of fast login service on a mobile phone. In the method, a login mode which is available in a mobile phone immediately is able to promote service effect of mobile Internet with a user entering an IP address via numeric keys and pressing an entry key; the patent is characteristic of additional functions: a pre-stored string automatically linking another string; an IP address with prefix/infix/suffix strings by which a user can quickly login and access a website.

With advantages of fast propagation, quick response codes as mainstream technology are short of privacy and pertinence and have an extra problem of homogeneous marketing induced by low cost.

In virtue of problems mentioned previously, a good marketing method for pertinence and particularity should be provided to users for their better usage experience.

SUMMARY OF THE INVENTION

To solve the above problems, the present disclosure describes an execution method of a guidance device. The guidance device electrically connected to equipment in which an operating system, Android 4.0 or other newer versions, is installed simulates a keyboard to complete key-in constantly and quickly and activate a specific Internet address.

An execution method of a guidance device in the present disclosure features a physical device for a user's good tactile sensation and marketing effect.

An execution method of a guidance device in the present disclosure features convenient link to the Internet and access to specific websites through a browser without remembering entry data (username and password, each of which may be forgotten or lost by a user) as well as Internet addresses.

An execution method of a guidance device in the present disclosure contributes to Internet marketing effect and a user's follow-up network behaviors for easy access to specific websites through a browser without remembering entry data (username and password) as well as Internet addresses.

For these purposes, an execution method of a guidance device depends on technical measures as follows. An execution method of a guidance device in the present disclosure is available to equipment with a miniature universal serial port and comprises following steps: step a: a guidance device is inserted into a first terminal unit; step b: the guidance device is electrically activated; step c: a decision module in an active component of the guidance device actively makes a request to the first terminal unit for linking a Human Interface Device (HID); step d: an automatic key-in module in the active component issues commands of pressing a Home key and a Search key sequentially; step e: a search box is activated by the first terminal unit according to step d; step f: the automatic key-in module automatically enters a specific address string in the search box and issues a command of pressing Enter for linking a website with respect to the specific address string.

Alternatively, an execution method of a guidance device depends on technical measures as follows. An execution method of a guidance device in the present disclosure is available to equipment with a miniature universal serial port and comprises following steps: step a: a guidance device is inserted into a first terminal unit; step b: the guidance device is electrically activated; step c: a decision module in an active component of the guidance device actively makes a request to the first terminal unit for linking a Human Interface Device (HID); step d: an automatic key-in module in the active component issues commands of pressing a Home key, a Search key and a B key sequentially; step e: an address bar is activated by the first terminal unit according to step d; step f: the automatic key-in module automatically enters a specific address string in the address bar and issues a command of pressing Enter for linking a website with respect to the specific address string.

An execution method of a guidance device further depends on the following technical measures for the purposes.

In the above execution method of a guidance device, step d is enabled after at least one-second delay when step c is completed.

In the above execution method of a guidance device, step e is enabled after at least one-second delay when step d is completed.

In the above execution method of a guidance device, the automatic key-in module issues commands of pressing at least a Tab key, entering a second specific string and pressing Enter when step f is completed.

In the above execution method of a guidance device, the specific address string comprises specific identification codes.

In contrast to conventional techniques, an execution method of a guidance device in the present disclosure has effects as follows: a browser is automatically activated by electronic equipment under an operating system (Android 4.0 or other newer versions) and followed by automatic key-in of a specific Internet address or entry data without operation of a user who has electrically linked a guidance device and the electronic equipment. Therefore, an execution method of a guidance device features (1) a user's good tactile sensation and marketing effect based on a physical device; (2) convenient link to the Internet and access to specific websites through a browser without remembering entry data (username and password, each of which may be forgotten or lost by a user) as well as Internet addresses; (3) Internet marketing effect and a user's follow-up network behaviors for easy access to specific websites through a browser without remembering entry data (username and password) as well as Internet addresses.

BRIEF DESCRIPTIONS OF THE DRAWINGS

DETAILED DESCRIPTIONS OF THE PREFERRED EMBODIMENTS

An execution method of a guidance device will be further illustrated in following embodiments for clear understanding of purposes, characteristics and effects.

Figure 1:
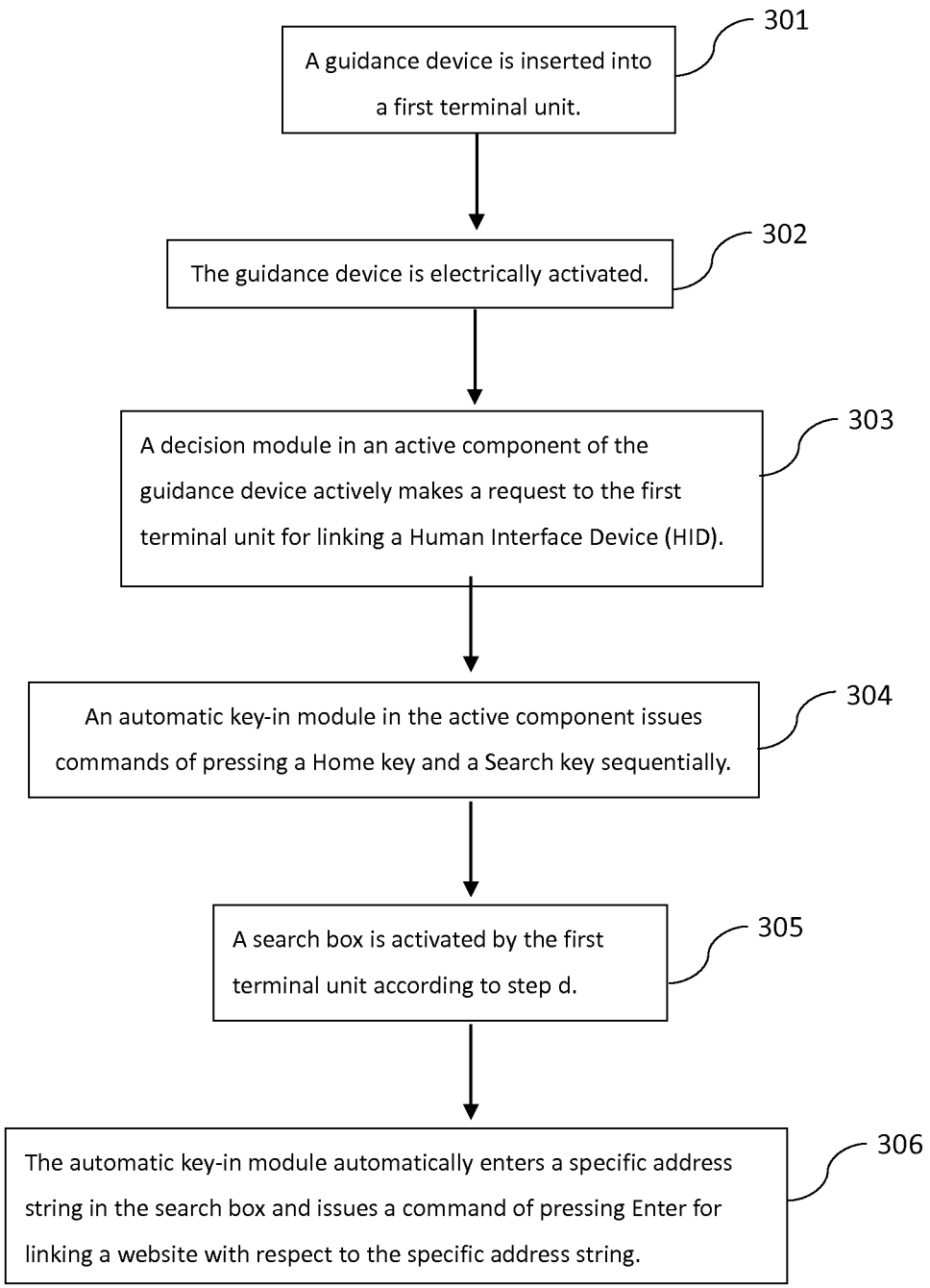
FIG. 1 is the first flow diagram for an execution method of a guidance device in the main embodiment.

FIG. 1 through FIG. 4 illustrate an execution method of a guidance device in main embodiments. Referring to FIG. 1 which illustrates an execution method of a guidance device comprises step a (301), step b (302), step c (303), step d (304), step e (305) and step f (306).

Referring to FIG. 1 which illustrates steps: a guidance device is inserted into a first terminal unit (step a: 301); the guidance device is electrically activated (step b: 302); a decision module in an active component of the guidance device actively makes a request to the first terminal unit for linking a Human Interface Device (HID) (step c: 303); an automatic key-in module in the active component issues commands of pressing a Home key and a Search key sequentially (step d: 304); a search box is activated by the first terminal unit according to step d (step e: 305); the automatic key-in module automatically enters a specific address string in the search box and issues a command of pressing Enter for linking a website with respect to the specific address string (step f: 306).

Figure 4:
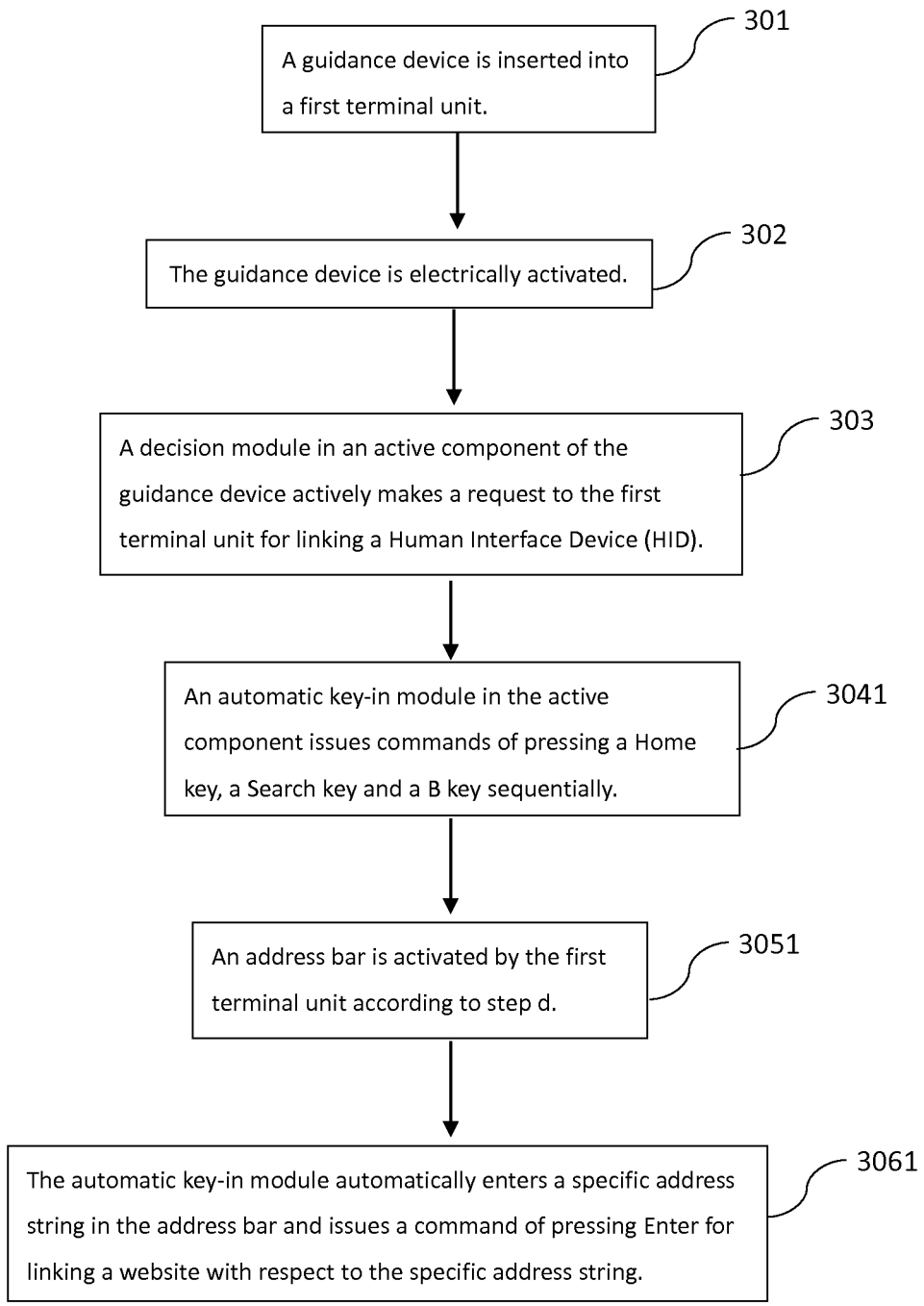
FIG. 4 is the fourth flow diagram for an execution method of a guidance device in the main embodiment.

Alternatively, referring to FIG. 4 which illustrates steps: a guidance device is inserted into a first terminal unit (step a: 301); the guidance device is electrically activated (step b: 302); a decision module in an active component of the guidance device actively makes a request to the first terminal unit for linking a Human Interface Device (HID) (step c: 303); an automatic key-in module in the active component issues commands of pressing a Home key, a Search key and a B key sequentially (step d': 3041); an address bar is activated by the first terminal unit according to step d (step e': 3051); the automatic key-in module automatically enters a specific address string in the address bar and issues a command of pressing Enter for linking a website with respect to the specific address string (step f': 3061).

The steps in FIG. 1 including step d (304), step e (305) and step f (306) are different from the steps in FIG. 4 including step d' (3041), step e' (3051) and step f'(3061); a website is activated through a search box in FIG. 1 and through a browser in FIG. 4, respectively.

Specifically, the guidance device is a USB (Universal Serial Bus) device, particularly a Human Interface Device (HID); the first terminal unit is provided with an outlet to which a plug of the guidance device is inserted so that the active component in the guidance device is enabled with the first terminal unit and the guidance device electrically activated; the active component is a microprocessor which receives and executes coded instructions from one or more terminals and exports signals for descriptions of status; the decision module in the active component which is electrically activated and receives signals will actively provide and recognize a keyboard for a Human Interface Device (HID).

Then, the automatic key-in module with predefined keyboard output functions is electrically activated for output of keyboard signals which simulate signals transmitted from a keyboard device; the Home key is used to restore an operating system's default desktop environment on which a guidance function still works when another software is executed; the search box is a graphic interface which is used in quick search in the Android system and called through a hotkey (such as Search) on a keyboard; the address bar presents a bar in a browser on which an Internet address is entered when the browser is activated and hotkeys (Search and B) are called through a keyboard; the specific address string is a Uniform/Universal Resource Locator (URL) for an ordinary website by which the content of a website is directed and presented and contributes to technical feasibility of thumbnail URL service.

Figure 2:
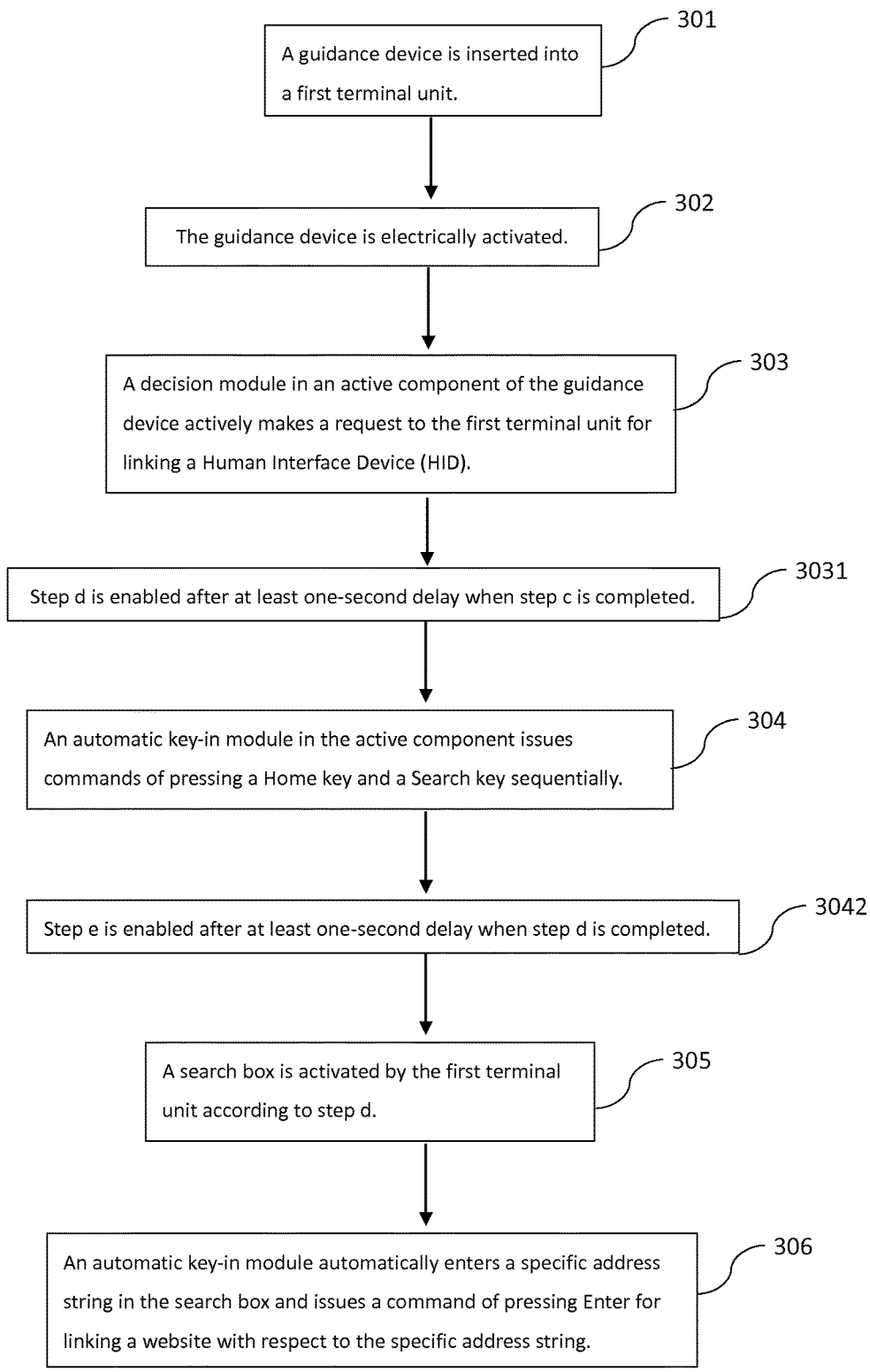
FIG. 2 is the second flow diagram for an execution method of a guidance device in the main embodiment.

Preferably, referring to FIG. 2 which illustrates additional step c' (3031) and step d" (3042): step d is enabled after at least one-second delay when step c is completed (step c': 3031); step e is enabled after at least one-second delay when step d is completed (step d": 3042). These additional two steps prevent most Android systems from unsmooth execution and problems with respect to activating a website.

Figure 3:
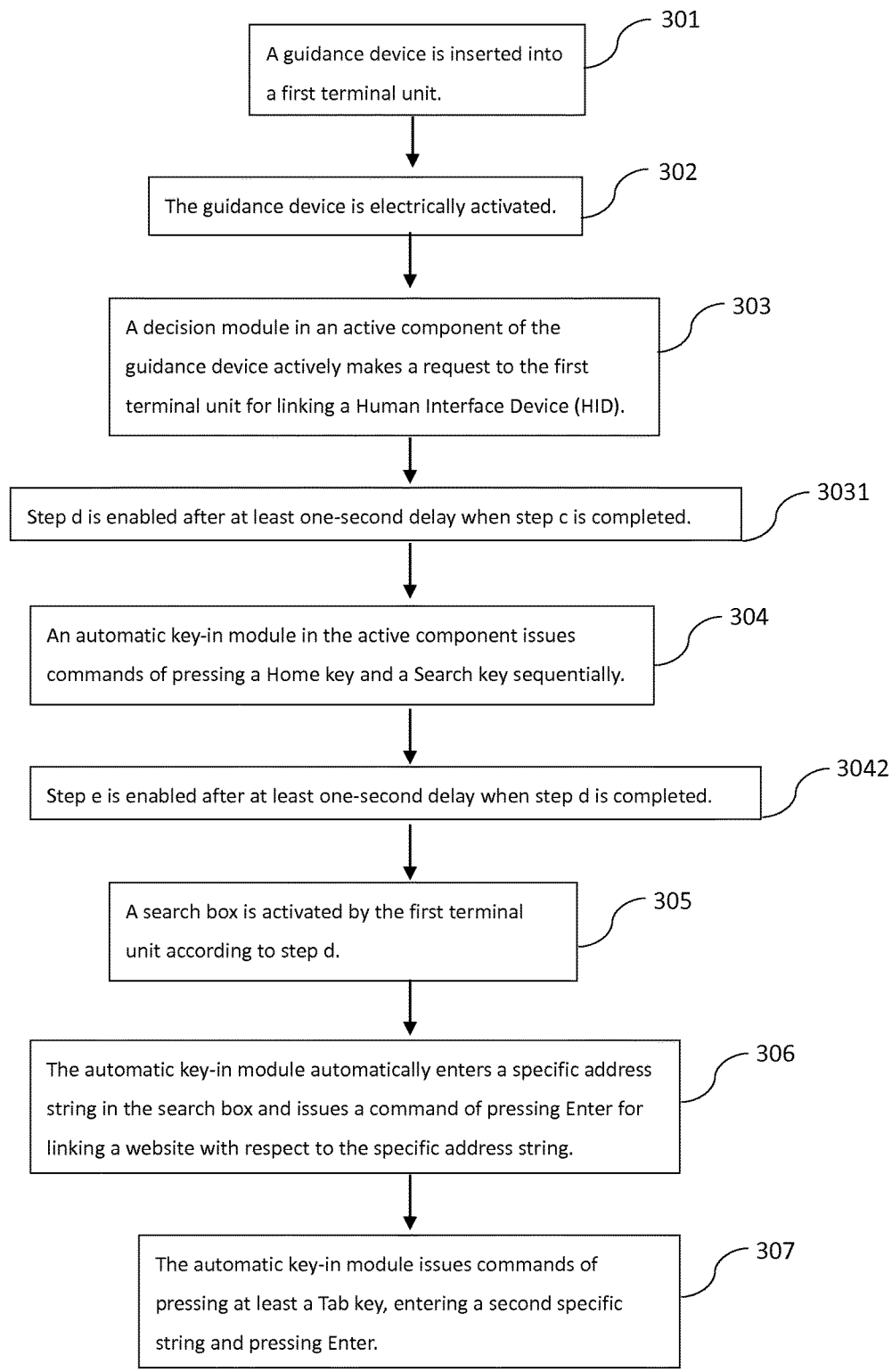
FIG. 3 is the third flow diagram for an execution method of a guidance device in the main embodiment.

Furthermore, referring to FIG. 3 which illustrates step g (307) in addition to step c' (3031) and step d" (3042): the automatic key-in module issues commands of pressing at least a Tab key, entering a second specific string and pressing Enter when step f is completed (step g: 307); moreover, the specific address string comprises specific identification codes which are used to identify a user and probably present a different content.

As described in embodiments, an execution method of a guidance device relates to an automatic-guidance flash drive and an execution method thereof. The guidance device electrically connected to equipment in which an operating system, Android 4.0 or other newer versions, is installed is able to simulate a keyboard for constant and quick hotkey-based key-in and activation of a specific website.

Accordingly, an execution method of a guidance device in the present disclosure, which differs from traditional marketing of ordinary websites and is referred to as creative work among similar products, meets patentability and is applied for the patent.

It should be reiterated that the above descriptions presents preferred embodiments, and any equivalent change in specifications, claims, or drawings still belongs to the technical field within the present disclosure with reference to claims hereinafter.

What is claimed is:

1. An execution method of a guidance device comprising the following steps:

inserting the guidance device into a first terminal unit to simulate a keyboard and activate a specific internet address through an automatic key-in module with predefined keyboard output functions;

in response to inserting the guidance device into the first terminal unit, activating the guidance device and enabling an active component in the guidance device;

making, by a decision module in the active component of the guidance device, a request to the first terminal unit for linking a Human Interface Device;

receiving, by the decision module in the active component of the guidance device, signals that actively provides and recognizes the keyboard for the Human Interface Device;

applying a first at least one second delay after making the request for linking the Human Interface Device and receiving the signals that actively provides and recognizes the keyboard for the Human Interface Device;

in response to applying the first at least one second delay, issuing a first command of sequentially pressing a Home Key and a Search Key through the automatic key-in module with predefined keyboard output functions in the active component of the guidance device, wherein the Home key allows to restore an operating system default desktop environment on which a guidance function still works when another software is executed;

applying a second at least one second delay after issuing the first command of sequentially pressing the Home Key and the Search Key through the automatic key-in module with predefined keyboard output functions in the active component of the guidance device;

in response to applying the second at least one second delay, activating a graphic interface search box through a hotkey of the automatic key-in module with predefined keyboard output functions in the active component of the guidance device, wherein the graphic interface search box allows a quick search in the operating system default desktop environment;

automatically entering a specific address string into the activated graphic interface search box through the automatic key-in module of the active component of the guidance device; and issuing a second command of pressing a Enter key through the automatic key-in module with predefined keyboard output functions for linking a website with the automatically entered specific address string.

2. An execution method of a guidance device comprising the following steps:

inserting the guidance device into a first terminal unit to simulate a keyboard and activate a specific internet address through an automatic key-in module with predefined keyboard output functions;

in response to inserting the guidance device into the first terminal unit, activating the guidance device and enabling an active component in the guidance device;

making, by a decision module in the active component of the guidance device, a request to the first terminal unit for linking a Human Interface Device;

receiving, by the decision module in the active component of the guidance device, signals that actively provides and recognizes the keyboard for the Human Interface Device;

applying a first at least one second delay after making the request for linking the Human Interface Device and receiving the signals that actively provides and recognizes the keyboard for the Human Interface Device;

in response to applying the first at least one second delay, issuing a first command of sequentially pressing a Home Key, a Search Key and a B key through the automatic key-in module with predefined keyboard output functions in the active component of the guidance device, wherein the Home key allows to restore an operating system default desktop environment on which a guidance function still works when another software is executed;

applying a second at least one second delay after issuing the first command of sequentially pressing the Home Key, the Search Key and the B key through the automatic key-in module with predefined keyboard output functions in the active component of the guidance device;

in response to applying the second at least one second delay, activating an address bar in the active component of the guidance device through the first terminal unit;

automatically entering a specific address string into the activated address bar through the automatic key-in module of the active component of the guidance device; and issuing a second command of pressing a Enter key through the automatic key-in module with predefined keyboard output functions for linking a website with the automatically entered specific address string.

3. An execution method according to claim 1 or 2, wherein issuing commands of Dressing at least a Tab key, entering a second specific address string and pressing a Enter key through the automatic key-in module with redefined keyboard output functions in the active component of the guidance device.

4. An execution method according to claim 1 or 2, wherein the specific address string comprises of specific identification codes.

* * * * *